P. PICK.
PROTECTOR OF FABRICS AGAINST MOTHS AND THE LIKE, AND A METHOD OF MAKING THE SAME.
APPLICATION FILED AUG. 18, 1916.
1,216,356. Patented Feb. 20, 1917.
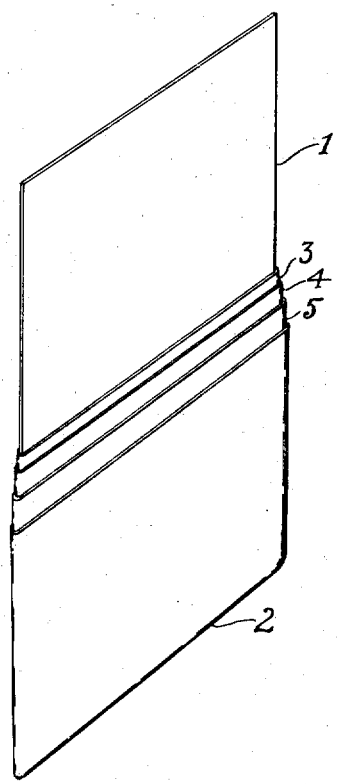
WITNESSES:
Philip K. Borman
Helen Hower
INVENTOR.
PAUL PICK
BY
Daniel J. Brennan
ATTORNEY.

UNITED STATES PATENT OFFICE.

PAUL PICK, OF CHICAGO, ILLINOIS.

PROTECTOR OF FABRICS AGAINST MOTHS AND THE LIKE AND A METHOD OF MAKING THE SAME.

1,216,356.  Specification of Letters Patent.  Patented Feb. 20, 1917.

Application filed August 18, 1916. Serial No. 115,660.

*To all whom it may concern:*

Be it known that I, PAUL PICK, a subject of the Emperor of Germany, residing at Chicago, in the county of Cook, State of Illinois, have invented a new and useful Protector of Fabrics Against Moths and the like, and a Method of Making the Same, of which the following is a specification.

This invention relates to a protector of fabrics, furs and the like, against attacks by moths and other insects and which comprises a combination of a chemical substance suitable for preventing the attack of insects on clothing, with a carrier for said chemical substance; the invention also relates to the process of manufacturing this article and comprises the steps for permanently applying said chemical substance or chemical substances to said carrier.

Valuable clothing, fabrics, furs and the like are frequently protected against moths and other insects by sifting flakes of camphor into the folds and pockets of the fabrics, or by placing camphor balls into the objects to be protected. The flake material readily evaporates, but always leaves traces in the folds or seams of the fabrics and furs, which is detrimental to the appearance of the same. Camphor balls in time become brittle, leaving granular material which is difficult to remove in folds or seams of the garment to the great discomfort of the wearer.

An object of the present invention is to combine permanently with a flat carrier in the form of a card board or the like a chemical substance of higher efficiency as a protective means against moths and similar insects, than camphor in flake or ball form, this chemical substance adhering to the carrier in the form of a coating and retaining its strength even after long, continued use.

Another object of the invention is to devise a novel method of permanently applying this protective substance to a carrier by dipping the carrier into a liquid substance and letting the substance harden on the outer surface of the carrier. Permanency of connection between carrier and chemical substance is assured by rendering the surface portion of the carrier porous to a high degree or by softening said portion prior to the dipping into the chemical liquid, so that this substance only adheres to the outer surface.

The drawing illustrates perspectively one of the protectors made in accordance with the claimed method.

The protector comprises a flat carrier 1 preferably made of wood-pulp or other cellulose material and may consist of ordinary card board. The upper half of the carrier is left free of the chemical substance 2 which adheres to all surface portions of the carrier in its lower half. While the upper half may be used as display portion for an imprint, as, for instance, when the protector is used as an advertising medium for clothing manufacturers and dealers, the lower half is coated with the chemical substance.

This chemical substance preferably consists of the crystallized or hardened product of a mixture containing hydrocarbons or nitro-derivatives of hydrocarbons of any kind. One of the preferred mixtures is nitronaphthalene or dinitronaphthalene with phenol, 9 parts by weight of dinitronaphthalene being mixed with 2 parts of phenol and being sufficiently heated to be converted into a liquid. But it is obvious that phenol alone as a derivative of aromatic hydrocarbons, and the esters of phenols may be used for forming a coating on the carrier 1.

In order to facilitate the coating, the mixture of solid hydrocarbons and phenol is heated, until converted into liquid condition. While upon dipping the carrier into this liquid the mixture probably would adhere to the carrier, this adhesion and connection is facilitated by softening or moistening that part of the carrier which is to be coated with the chemical substance. After the carrier has received a coating it is left to dry. After the coating has become dry, another coating is applied, and this process may be repeated whereby several layers are formed, as indicated at 3, 4 and 5 in the drawing.

The protector manufactured in this way merely comprises a coated cardboard, and can easily be put into pockets or between folds of garments, without becoming brittle or crumbling away. It is more efficient in its protection against moths than camphor, can readily be removed and reused, can be manufactured at low cost, can not be lost by waste (as flakes) and may readily be combined with advertisements.

I claim:—

1. As an article of manufacture, a cardboard provided on all sides with a coating of a hardened mixture of dinitronaphthalene and phenol, the mixture covering a portion of the cardboard only and mechanically combined therewith.

2. As an article of manufacture, a cardboard provided on all sides with a coating of a hardened mixture of dinitronaphthalene and phenol.

PAUL PICK.